Figure 1:
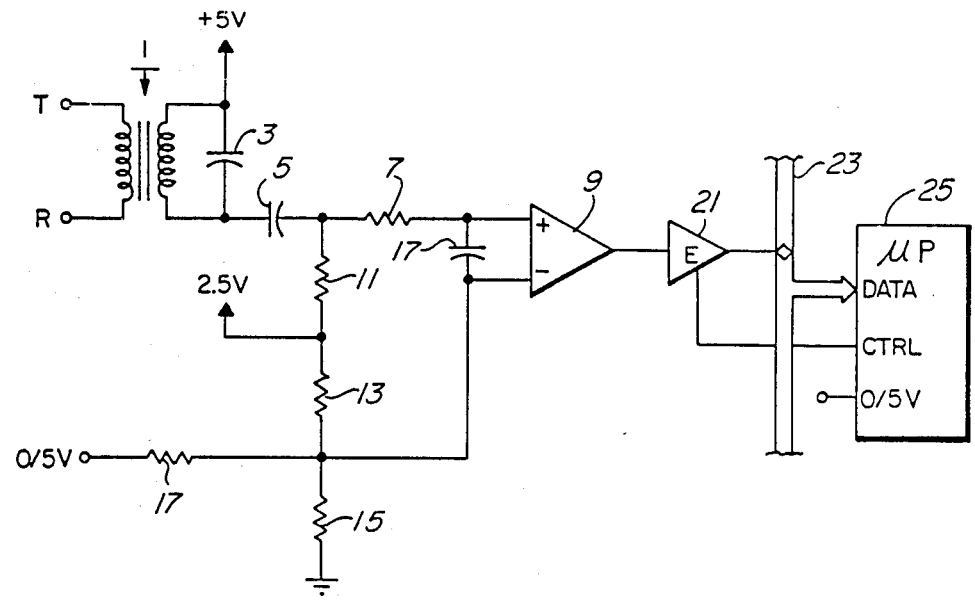

United States Patent [19]

Beirne

[11] Patent Number: 4,747,131
[45] Date of Patent: May 24, 1988

[54] DIAL TONE DETECTOR

[75] Inventor: Patrick R. Beirne, Kanata, Ontario, Canada

[73] Assignee: Mitel Datacom Inc., Boca Raton, Fla.

[21] Appl. No.: 898,590

[22] Filed: Aug. 21, 1986

[30] Foreign Application Priority Data

Nov. 22, 1985 [CA] Canada .................................. 496063

[51] Int. Cl.$^4$ ............................................ H04M 1/00
[52] U.S. Cl. .................................... 379/372; 379/386
[58] Field of Search .................... 379/40, 69, 372, 377, 379/355, 356, 359, 386, 387, 200, 280, 283; 381/46; 328/138, 139, 140

[56] References Cited

U.S. PATENT DOCUMENTS

| | | | |
|---|---|---|---|
| 4,061,885 | 12/1977 | Nash et al. | 379/283 |
| 4,091,243 | 5/1978 | Mizrahi et al. | 379/283 |
| 4,142,177 | 2/1979 | Davis | 379/386 |
| 4,246,445 | 1/1981 | Hayasaka et al. | 379/200 |
| 4,405,833 | 9/1983 | Cave et al. | 379/372 |
| 4,439,639 | 3/1984 | Munter | 379/386 |
| 4,536,618 | 8/1985 | Serrano | 379/372 |
| 4,567,328 | 1/1986 | Carrasco et al. | 379/386 |

Primary Examiner—James L. Dwyer
Attorney, Agent, or Firm—Pascal & Associates

[57] ABSTRACT

A method for detecting the presence of a predetermined dual tone signal on a conductor including steps of performing threshold detection on the conductor for detecting the presence of signals having an amplitude greater than a predetermined threshold signal, and in the event of detection of a signal having substantial amplitude, detecting the periods of a predetermined number of successive cycles of the signal, and in the event the successive detected periods are different, detecting an average value of the periods. In the event the average period corresponds to a frequency equivalent to the average frequency of the predetermined dual tone signal, an output signal is generated indicative of the presence of the dual tone signal. This method can advantageously be used for detection of dial tone on a telephone conductor. A method is straightforward and can be easily implemented by a microprocessor program in conjunction with simple threshold detection circuitry.

13 Claims, 1 Drawing Sheet

DIAL TONE DETECTOR

This invention relates in general to tone detection, and more particularly to a method and apparatus for detecting dial tone carried by a telephone line in a telephone system.

Various tones are used in telephone systems for both control and call status information, and are known generally as call progress tones. These tones are typically transmitted by a central office and transmitted via telephone lines to a calling party utilizing a telephone or PBX in order to inform the calling party about the status of his or her call. For instance, dial tone is a continuous tone made by combining signals having frequencies of 350 hertz and 440 hertz, and is transmitted to the calling party by the central office after recognizing that the telephone of the calling party has been taken off-hook, indicating that the central office or local exchange is ready to receive dialed digits or DTMF tones for completing the call.

Prior art dial tone detectors typically utilized bandpass filtering and threshold detection circuitry for detecting audio signals having frequencies in the range of from approximately 300-600 hertz. In the event the detected signals were of a predetermined amplitude, dial tone was deemed to be present.

However, a number of other supervisory tones (such as ring back and no such number) are comprised of signals in the same approximate range of frequencies. Thus, prior art dial tone detectors were susceptible to inadvertently detecting supervisory tones other than dial tone, as well as speech signals in the same frequency range.

Accordingly, in order to provide more accurate detection, further prior art circuits utilized a pair of bandpass filters for separating the 350 hertz and 440 hertz signals. The filters were required to exhibit steep filter skirts and be of narrow bandwidth such that extraneous noise signals were not translated as tone signals. Furthermore, the filters were required to be accurately tuned to the above described frequencies of 350 hertz and 440 hertz. Due to the tuning, steep filter skirts and narrow bandwidth requirements, the bandpass filters utilized in prior art dial tone detectors were relatively expensive, particularly after including the cost of tuning them individually prior to shipment or being placed in service.

According to the present invention, a dial tone detector is disclosed which does not require highly accurate and costly filters as noted above. A signal is received from a telephone line or conductor and applied to a zero crossing detector, for determining the periods of successive cycles of the signal. The signal is periodically compared in a threshold detector to a threshold signal for determining whether the signals are of substantial amplitude in relation to the threshold signal. In the event that signals of substance are detected, zero crossing detection is continued. The average period of the successive zero crossings is calculated by a microprocessor, and in the event the calculated period corresponds to a frequency approximating the average of the 350 hertz and 440 hertz dial tone signal, the microprocessor generates a signal indicative of the presence of dial tone having been detected.

The dial tone detector according to the present invention is inexpensive and of simple and rugged design. Unnecessary microprocessor processing time is avoided by performing the aforementioned average period calculation only in the event signals of substance have been detected.

In a preferred embodiment of the invention, the microprocessor detects whether successive zero crossings of the received signal exhibit a constant period, indicative of a single tone being present on the line, as opposed to dual tone. In the event of detection of single tone, the microprocessor does not proceed with calculation of the average period as described above, such that further unnecessary microprocessor processing time is avoided.

Figure 2:
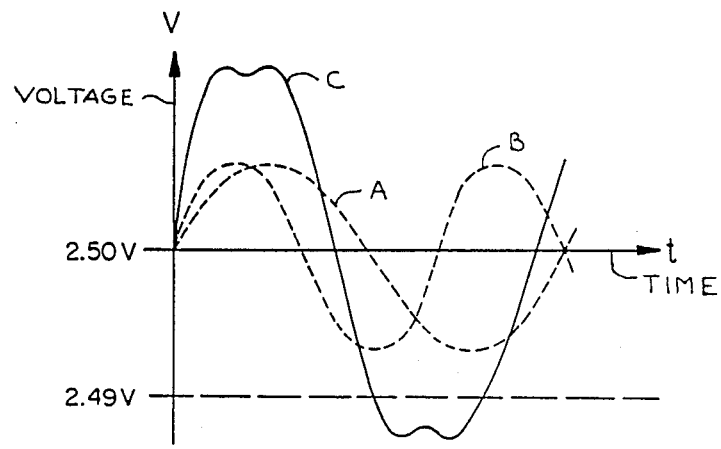

A better understanding of the invention will be obtained by reference to the detailed description below in conjunction with the following drawings, in which:

FIG. 1 is a schematic diagram of a circuit according to a preferred embodiment of the invention, and FIG. 2 is a waveform diagram of a single cycle of a typical received dial tone signal.

With reference to FIG. 1, an audio transformer 1 is shown connected to tip and ring terminals T and R for connection to a telephone line comprised of tip and ring leads. A capacitor 3 is connected across a secondary winding of transformer 1 and to a source of voltage which, according to a successful prototype of the invention was +5 volts. A capacitor 5 is connected in series with a resistor 7 between the secondary winding of transformer 1 and a non-inverting input of a comparator 9 for AC coupling audio signals received from the tip and ring leads via the tip and ring terminals T and R and coupled via transformer 1.

A node connecting capacitor 5 and resistor 7 is connected via a resistor 11 to a further source of voltage which, according to the successful prototype was 2.50 volts. A pair of series connected resistors 13 and 15 are connected between the source of 2.50 volts and ground, and the node connecting resistors 13 and 15 is connected via a further resistor 17 to a terminal connected to a variable voltage output 0/5 volts of microprocessor 25, for generating one of either a logic low or high level signal (0 and 5 volts respectively), in response to execution of an internal program described in greater detail below. Thus, microprocessor 25 causes the voltage applied to the inverting input of comparator 9 to vary between one of either 2.49 volts (for performing threshold detection) and 2.50 volts (for performing zero crossing detection) as described below in greater detail.

The node connecting resistors 13, 15 and 17 is further connected to an inverting input of comparator 9, and a capacitor 17 is connected between the inverting and non-inverting inputs of comparator 9 for filtering radio frequency signals in a well known manner.

An output terminal of comparator 9 is connected to a microprocessor controlled gate 21 having an output connected to a data bus 23 of microprocessor 25, and an enable input E connected to a control line of a microprocessor control bus CTRL of microprocessor 25.

In operation, signals carried by the tip and ring leads are received on the tip and ring terminals T and R and coupled via transformer 1 so as to be applied to the non-inverting input of comparator 9 via AC coupling capacitor 5 and resistor 7.

Microprocessor 25 generates a logic low voltage signal, i.e. 0 volts on the 0/5 volt output thereof for application to resistor 17. Resistors 13, 15 and 17 function as a voltage divider such that the resultant voltage appearing on the inverting input of comparator 9 is 2.49 volts. Resistors 15 and 17 are preferably equal valued resistors, and according to the successful prototype resistor 13 was 100 ohms, and resistors 15 and 17 were each 51k ohms.

Audio signals received from the tip and ring terminals T and R are superimposed on, or summed with a 2.50 volt DC signal applied to the node connecting capacitor 5 and resistor 7 via resistor 11, for application to the non-inverting input of comparator 9.

Thus, with reference to FIG. 2, in the event the node connecting resistors 13, 15 and 17 carries a voltage of 2.49 volts DC, which is applied to the inverting input of comparator 9, then received signals having amplitudes greater than 10 millivolts cause comparator 9 to generate a succession of low level output signals corresponding to successive threshold crossings of the received signal with respect to the 2.49 volt threshold signal. The output signals are applied to the input of gate 21, which generates a succession of logic low level control signals in response thereto. Microprocessor 25 enables gate 21 and receives the control signals via data bus 23.

In the event the tip and ring leads are carrying only noise or extraneous signals having amplitudes of less than 10 millivolts, comparator 9 generates a continuous high level signal which is received by microprocessor 25 via gate 21 and data bus 23. In response, microprocessor 25 does no further processing of the received signal.

However, in the event of detection of a signal of substance (i.e. a signal having an amplitude greater than 10 millivolts) microprocessor 25 generates a logic high (+5 volt) signal for application to resistor 17. In response, the node connecting resistors 13, 15 and 17 carries a signal having a level of 2.50 volts, which is applied to the inverting input of comparator 9. Thus, comparator 9 functions as a zero crossing detector. Microprocessor 25 monitors the signals appearing on the output of comparator 9 via gate 21 and detects the length of time between three successive zero crossings, corresponding to the period of a single cycle of the received signal, in response to execution of an internal program. A source code listing of the internal program is attached hereto as Appendix A.

It is well known from elementary acoustics that a dual tone having equal amplitude parts or component signals exhibits a period which varies between the periods of the individual component signals. However, the average of successive ones of the varying periods converges to the average period of the equal amplitude components.

Thus, in the event of dial tone being received, the signal applied to the non-inverting input of comparator 9 is in the form of a signal having equal amplitude 350 herts and 440 hertz components, offset by 2.50 volts DC. In the event the two component signals are mixed equally, an average period is measured, corresponding to an average frequency of 395 hertz.

It is well known from trigonometry that the sum of two sine waves (eg. sine waves A and B in FIG. 2), having two separate frequencies is related to a product of two sine waves, the first of the multiplied sine waves having a frequency which is the sum of the two separate frequencies, and the second having a frequency which is the difference of the two separate frequencies. Thus, the summed 350 hertz and 440 hertz signals are the mathematical equivalent of a 395 hertz signal multiplied by, or amplitude modulated at a rate of 90 hertz. Hence, microprocessor 25 detects a signal (eg. resultant signal C in FIG. 2) having a period corresponding to 395 hertz which is periodically inverted, or amplitude modulated at a rate of 90 hertz.

However, in the event the tones appear in unequal proportions, wherein the dominant component signal is greater than approximately 3 decibels more powerful than the subdominant component frequency, the microprocessor 25 detects an average period approximately equal to the period of the dominant frequency component signal.

In the event two or more identical periods are detected a single tone is dominant, and the frequency of the detected single tone is calculated, or alternatively processing of the signal is aborted in order to avoid unnecessary utilization of processor time.

In the event of dual tone being received, the microprocessor averages the detected periods and generates an average period signal in response thereto. For instance, according to the successful prototype of the invention eight such detected periods were averaged. Microprocessor 25 then compares the detected average period signal with an internal table of stored periods to determine whether the detected average period corresponds to a frequency which is greater than 350 hertz and less than 440 hertz, in which case dial tone is deemed to be present on the telephone line and a signal indicative thereof is generated by miroprocessor 25. For instance, the microprocessor 25 can generate a signal for splitting and terminating the tip and ring leads T and R, or for initializing an automatic dialing circuits, etc.

In a preferred embodiment of the invention, a plurality of such simple and inexpensive dial tone detector circuits were each connected via a plurality of gates, such as gate 21 to the data bus 23, and microprocessor 25, in order that dial tone detection could be implemented simultaneously on a plurality of telephone lines.

According to the successful prototype, microprocessor 25 executed the aforementioned tone detection program every approximately 10 milliseconds, and the program required approximately 4.5 milliseconds for execution. According to one embodiment of the invention, threshold detection and zero crossing detection were implemented on alternate executions of the program. According to a second embodiment, zero crossing detection was performed during seven out of ten executions and threshold detection was performed during three out of ten executions.

Also, according to the successful prototype, the threshold detection portion of the program required that the received signal have an amplitude of greater than 10 millivolts for at least 0.25 milliseconds, in order that spurious signal transients due to lightening strikes, etc., are not detected as being signals of substance for which the period is to be detected.

A person understanding the present invention may conceive of other variations or embodiments thereof. For instance, while according to the preferred embodiment dial tone detection is described, in fact any dual tone signal may be detected according to the present invention. This, and all other such variations or embodiments are believed to be within the sphere and scope of the present invention as defined by the claims appended hereto.

APPENDIX A

| | | | | | |
|---|---|---|---|---|---|
| F1F7 | A | FE | 0402 | cdtd | ldx CT1 |
| F1FA | a | 8C | 1308 | | cpx #5000 ; about 5 6 ms |
| F1FD | A | 2E | 01 | | bgt dtd1 |
| F1FF | A | 39 | | dtd3 | rts |
| F200 | A | DF | 08 | dtd1 | stx wi0 |
| F202 | A | 96 | 1E | | ldaa trk0ws+dbflgs |
| F204 | A | 9A | 2F | | oraa trk1ws+dbflgs |
| | | | | .IFZ ONE__A | |
| F206 | A | 9A | 40 | | oraa trk2ws+dbflgs |
| F208 | A | 9A | 51 | | oraa trk3ws+dbflgs |
| | | | | ENDC | |
| F20A | A | 84 | 01 | | anda #dbwfdt |
| F20C | A | 27 | F1 | | beq dtd3   only run if a |
| F20E | A | 96 | 01 | | ldaa tick   line needs it! |
| F210 | A | 84 | 03 | | anda #3 |
| F212 | A | 26 | 03 | | bne dtd2a   do 70% of the time |
| F214 | A | 7E | F2FA | | jmp dtd2 |
| F217 | A | 96 | 08 | dtd2a | ldaa wi0 |
| F219 | A | 80 | 10 | | suba #$10 ; high byte: $1000= 4000 counts=4.5 ms |
| F21B | A | 97 | 08 | | staa wi0 ; create eot (end of time) |
| | | | 000C | ghdtd | set trknum   ghost of dtd hardware |
| | | | 000E | g | set trkh   transition counter; uses db4/db0 for line 0 |
| F21D | A | 86 | 51 | | LDAA #UARTC1 |
| F21F | A | B7 | 0200 | | SIAA UARTST   CHANGE TO 0 MV THRESHOLD |
| F222 | A | 4F | | | clra |
| F223 | A | 97 | 0F | | staa curwap   all curwaps are on page 0 |
| F225 | A | 86 | 40 | | ldaa #high(trk0hw)   all curhwas are on this page (usually $40) |
| F227 | A | 97 | 11 | | staa curhwa |
| F229 | A | 86 | F3 | | ldaa #high(hwatb2) |
| F22B | A | 97 | 0A | | staa wil   top of pointer to lookup table |
| F22D | A | 7F | 000E | | clr g |
| F230 | A | F6 | 0101 | | ldab dtd   ;else do period counting |
| F233 | A | D7 | 0C | | stab ghdtd |
| F235 | A | FE | 0402 | dtloop | ldx ctl |
| F238 | A | 9C | 0B | | cpx wi0   loop while there's time |
| F23A | A | 2D | 03 | | blt dtd3 |
| F23C | A | B6 | 0101 | | ldaa dtd |
| F23F | A | 98 | 0C | | eora ghdtd   see if anything changed |
| F241 | A | 84 | 0F | | anda #LINMSK   just look at lower 4 bits |
| F243 | A | 27 | F0 | | beq dtloop |
| F245 | A | 46 | | | rora |
| F246 | A | 25 | 08 | | bcs dt2 |
| F248 | A | 46 | | | rora |
| F249 | A | 25 | 0C | | bcs dt3 |
| F24B | A | 46 | | | rora |
| F24C | A | 25 | 10 | | bcs dt4 |
| F24E | A | 20 | 15 | | bra dt5 |
| F250 | A | C6 | 11 | dt2 | ldab #$11 |
| F252 | A | CE | 0018 | | ldx #trk0ws |
| F255 | A | 20 | 13 | | bra dt6 |
| F257 | A | C6 | 22 | dt3 | ldab #$22 |
| F259 | A | CE | 0029 | | ldx #trk1ws |
| F25C | A | 20 | 0C | | bra dt6 |
| F25E | A | C6 | 44 | dt4 | ldab #$44 |
| F260 | A | CE | 003A | | ldx #trk2ws |
| F263 | A | 20 | 05 | | bra dt6 |
| F265 | A | C6 | 88 | dt5 | ldab #$88 |
| F267 | A | CE | 004B | | ldx #trk3ws |
| F26A | A | 17 | | dt6 | tba |
| F26B | A | 98 | 0C | | eora ghdtd |
| F26D | A | 97 | 0C | | staa ghdtd   update ghost |
| F26F | A | 17 | | | tba |
| F270 | A | 94 | 0E | | anda g   extract the g bits |
| F272 | A | 85 | 0F | | bita #$f   look at the lower |
| F274 | A | 27 | 0A | | beq geven   if even, then |
| F276 | A | 85 | F0 | godd | bita #$f0   g is 1 or 3 |

-continued

APPENDIX A

| | | | | | | |
|---|---|---|---|---|---|---|
| F278 | A | 26 | BB | | bne dtloop | if g was 3, do nothing |
| F27A | A | D8 | 0E | | eorb g | if g was 1, change it to 2 |
| F27C | A | D7 | 0E | | stab g | |
| F27E | A | 20 | B5 | | bra dtloop | |
| F280 | A | 40 | | geven | tsta | |
| F281 | A | 26 | 18 | | bne g2 | |
| F283 | A | C4 | 0F | g0 | andb #$f | |
| F285 | A | DA | 0E | | orab g | |
| F287 | A | D7 | 0E | | stab g | |
| F289 | A | B6 | 0402 | | ldaa ctl | |
| F28C | A | B6 | 0403 | | ldab ctl+1 | read the timer chip |
| F28F | A | 46 | | | rora | |
| F290 | A | 56 | | | rorb | |
| F291 | A | 46 | | | rora | |
| F292 | A | 56 | | | rorb | |
| F293 | A | 46 | | | rora | |
| F294 | A | 56 | | | rorb | |
| F295 | A | 46 | | | rora | |
| F296 | A | 56 | | | rorb | pick out the relevent bits |
| F297 | A | E7 | 0E | | stab iper, x | |
| F299 | A | 20 | 9A | | bra dtloop | |
| F29B | A | D7 | 0D | g2 | stab trkmsk | store it away |
| F29D | A | DA | 0E | | orab g | set g=3 |
| F29F | A | D7 | 0E | | stab g | |
| F2A1 | A | B6 | 0402 | | ldaa ctl | |
| F2A4 | A | F6 | 0403 | | ldab ctl+1 | |
| F2A7 | A | 59 | | | rolb | |
| F2A8 | A | 49 | | | rola | |
| F2A9 | A | 59 | | | rolb | |
| F2AA | A | 49 | | | rola | |
| F2AB | A | 59 | | | rolb | |
| F2AC | A | 49 | | | rola | |
| F2AD | A | 59 | | | rolb | pick out the relevent bits |
| F2AE | A | 49 | | | rola | |
| F2AF | A | A0 | 0E | | suba iper, x | |
| F2B1 | A | 40 | | | nega | |
| F2B2 | A | 81 | F0 | | cmpa #$f0 | throw out too large samples |
| F2B4 | A | | | | bhs g2g | |
| F2B6 | A | 36 | | | psha | |
| F2B7 | A | A7 | 0E | | staa iper, x | |
| F2B9 | A | E6 | 0F | g2c | ldab aper, x | |
| F2BB | A | 44 | | g2d | lsra | else, do a 1/8 average |
| F2BC | A | 54 | | | lsrb | |
| F2BD | A | 44 | | | lsra | |
| F2BE | A | 54 | | | lsrb | |
| F2BF | A | 44 | | | lsra | |
| F2C0 | A | 54 | | | lsrb | |
| F2C1 | A | 10 | | | sba | |
| F2C2 | A | AB | 0F | | adda aper, x | |
| F2C4 | A | A7 | 0F | | staa aper, x | |
| F2C6 | A | DF | 0F | | stx curwap | |
| F2C8 | A | D6 | 0D | | ldab trkmsk | |
| F2CA | A | C4 | 0E | | andb #$0E | FORM 0,2,4,8 |
| F2CC | A | CB | AC | | addb #low(hwatb2) | point at table |
| F2CE | A | D7 | 0B | | stab wil+1 | |
| F2D0 | A | DE | 0A | | ldx wil | |
| F2D2 | A | EE | 00 | | ldx, 0,x | get the curhwa |
| F2D4 | A | 33 | | | pulb | recall the iper |
| F2D5 | A | A1 | 25 | | cmpa tperl,x | |
| F2D7 | A | | | | blo g2f | |
| F2D9 | A | A1 | 24 | | cmpa tperl,x | |
| F2DB | A | 22 | 09 | | bhi g2f | |
| F2DD | A | DE | 0F | g2i | ldx curwap | |
| F2DF | A | 6C | 10 | | inc nper,x | |
| F2E1 | A | A6 | 10 | | ldaa nper,x | this is for the logic analyzer's benefit |
| F2E3 | A | 7E | F235 | g2g | jmp dtloop | |
| F2E6 | A | | 25 | g2f | cmpb tperl,x | |
| F2E8 | A | | | | blo g2h | |
| F2EA | A | E1 | 24 | | cmpb tperh,x | |
| F2EC | A | 22 | 02 | | bhi g2h | |
| F2EE | A | 20 | ED | | bra g2i | |
| F2F0 | A | DE | 0F | g2h | ldx curwap | |

APPENDIX A -continued

| | | | | | | |
|---|---|---|---|---|---|---|
| F2F2 | A | 6D | 10 | | tst nper,x | if wrong period, then nper-- |
| F2F4 | A | 27 | ED | | beq g2g | |
| F2F6 | A | 6A | 10 | | dec nper,x | don't roll through 0 |
| F2F8 | A | 20 | E9 | | bra g2g | |
| | | | | *other half of dtd, using threshold | | |
| F2FA | A | 86 | 11 | dtd2 | ldaa #uartc0 | |
| F2FC | A | B7 | 0200 | | staa uartst | |
| F2FF | A | 96 | 0B | | ldaa wi0 | |
| F301 | A | 80 | 0B | | suba #$0B | ;high byte: 0B00= 2816 counts=3.147 ms |
| F303 | A | 97 | 08 | | staa wi0 | ;create eot (end of time) |
| F305 | A | 7F | 0026 | dtd11 | clr iper+trk0ws | |
| F308 | A | 7F | 0037 | | clr iper+trk1ws | |
| | | | | .IFZ ONE_A | | |
| F30B | A | 7F | 0048 | | clr iper+trk2ws | |
| F30E | A | 7F | 0059 | | clr iper+trk3ws | |
| | | | | .ENDC | | |
| F311 | A | 96 | 28 | | ldaa nper+trk0ws | |
| F313 | A | 80 | 02 | | suba #2 | |
| F315 | A | 24 | 01 | | bcc dtd8a | |
| F317 | A | 4F | | | clra | |
| F318 | A | 97 | 28 | dtd8a | staa nper+trk0ws | |
| F31A | A | 96 | 39 | | ldaa nper+trk1ws | |
| F31C | A | 80 | 02 | | suba #2 | |
| F31E | A | 24 | 01 | | bcc dtd8b | |
| F320 | A | 4F | | | clra | |
| F321 | A | 97 | 39 | dtd8b | staa nper+trk1ws | |
| | | | | .IFZ ONE_A | | |
| F323 | A | 96 | 4A | | ldaa NPER+trk2ws | |
| F325 | A | 80 | 02 | | suba #2 | |
| F327 | A | 24 | 01 | | bcc dtd8c | |
| F329 | A | 4F | | | clra | |
| F32A | A | 97 | 4A | dtd8c | staa nper+trk2ws | |
| F32C | A | 96 | 5B | | ldaa nper+trk3ws | |
| F32E | A | 80 | 02 | | suba #2 | |
| F330 | A | 24 | 01 | | bcc dtd8d | |
| F332 | A | 4F | | | clra | |
| F333 | A | 97 | 5B | dtd8d | staa nper+trk3ws | |
| | | | | .ENDC | | |
| F335 | A | FE | 0402 | dtd9 | ldx CT1 | |
| F338 | A | 9C | 0B | | cpx wi0 | ;while not_out_of_time |
| F33A | A | 2D | 33 | | BLt dtd9x | |
| F33C | A | C6 | 01 | | ldab #1 | ;all these do is load b=11...88 and x=2ap[i] |
| F33E | A | CE | 0018 | | ldx #trk0ws | |
| F341 | A | 8D | 2D | | bsr dtd10 | |
| F343 | A | FE | 0402 | | ldx CT1 | |
| F346 | A | 9C | 08 | | cpx wi0 | ;while not_out_of_time |
| F348 | A | 2D | 25 | | blt dtd9x | |
| F34A | A | C6 | 02 | | ldab #$2 | |
| F34C | A | CE | 0029 | | ldx #trk1ws | |
| F34F | A | 8D | 1F | | bsr dtd10 | |
| | | | | .IFZ ONE_A | | |
| F351 | A | FE | 0402 | | ldx CT1 | |
| F354 | A | 9C | 08 | | cpx wi0 | ;while not_out_of_time |
| F356 | A | 2D | 17 | | blt dtd9x | |
| F358 | A | C6 | 04 | | ldab #$4 | |
| F35A | A | CE | 003A | | ldx #trk2ws | |
| F35D | A | 8D | 11 | | bsr dtd10 | |
| F35F | A | FE | 0402 | | ldx CT1 | |
| F362 | A | 9C | 08 | | cpx wi0 | ;while not_out_of_time |
| F364 | A | 2D | 09 | | blt dtd9x | |
| F366 | A | C6 | 08 | | ldab #$8 | |
| F368 | A | CE | 004B | | ldx #trk3ws | |
| F36B | A | 8D | 03 | | bsr dtd10 | |
| | | | | .ENDC | | |
| F36D | A | 20 | C6 | | bra dtd9 | |
| F36F | A | 39 | | dtd9x | rts | |
| F370 | A | F5 | 0101 | dtd10 | bitb dtd | ;very simple checker: is there a low there? |
| F373 | A | 26 | 36 | | bne dtd13 | |
| F375 | A | 6C | 0E | | inc iper,x | ;if so, then inc iper |
| F377 | A | A6 | 0E | | ldaa iper,x | |
| F379 | A | 81 | 05 | | cmpa #5 | |
| F37B | A | 26 | 2E | | bne dtd13 | |
| F37D | A | | | | chkdb wfdt | |
| F381 | A | 27 | 28 | | beq dtd13 | ;don't report unless required to |

-continued

APPENDIX A

| | | | | | | |
|---|---|---|---|---|---|---|
| F383 | A | DF | OF | | stx curwap | |
| F385 | A | A6 | 10 | | ldaa nper,x | reporting |
| F387 | A | 8B | 02 | | adda#2 | |
| F389 | A | A7 | 10 | | staa nper,x | make up for the double dec at entry |
| F38B | A | C4 | OE | | andb #$e | |
| F38D | A | CB | AC | | addb #low(hwatb2) | |
| F38F | A | D7 | OB | | stab wil+1 | |
| F391 | A | C6 | F3 | | ldab #high(hwatb2) | |
| F393 | A | D7 | OA | | stab wil | |
| F395 | A | DE | OA | | ldx wil | |
| F397 | A | EE | 00 | | ldx 0,x | get curhwa |
| F399 | A | A1 | 26 | | cmpa tnper,x | |
| F39B | A | | | | blo dtdl3 | ;return if not enough SUCCESSFUL samples taken |
| F39D | A | DE | OF | | ldx curwap | |
| F39F | A | | | | setok wfdt | |
| F3A5 | A | | | | clrdb wfdt | |
| F3AB | A | 39 | | dtdl3 | rts | |

I claim:

1. A method of detecting the presence on a conductor, of a dual tone signal comprised of a first signal of first predetermined frequency and a second signal of second predetermined frequency greater than said first frequency, comprising the steps of:
   (a) generating a predetermined threshold signal,
   (b) monitoring said conductor for the presence of a signal having amplitude greater than said predetermined threshold signal,
   (c) in the event of detection of a signal having amplitude greater than said threshold signal, detecting the periods of a predetermined number of successive cycles of said signal, and
   (d) in the event successive ones of said detected periods are the same, providing an indication that said signal is a single tone, and in the event successive ones of said detected periods are different, detecting an average value of said periods, and in the event said average value corresponds to a frequency which is greater than or equal to said first predetermined frequency and less than or equal to said second predetermined frequency, generating an output signal indicative of the presence of said dual tone signal.

2. A method as defined in claim 1, wherein said dual tone signal is dial tone, and said conductor is a telephone line.

3. A method as defined in claim 2, wherein said first predetermined frequency is 350 hertz and said second frequency is 440 hertz.

4. A method as defined in claim 1, wherein said step of detecting the periods of said successive cycles is further comprised of comparing the amplitude of said signal on the conductor to a further threshold signal for detecting successive zero crossings of said signal on the conductor, and measuring the duration of time between three such successive zero crossings.

5. A method as defined in claim 2, wherein said step of detecting the periods of said successive cycles is further comprised for comparing the amplitude of said signal on the conductor to a further threshold signal for detecting successive zero crossings of said signal on the conductor, and measuring the duration of time between three such successive zero crossings.

6. A method as defined in claim 3, wherein said step of detecting the periods of said successive cycles is further comprised of comparing the amplitude of said signal on the conductor to a further threshold signal for detecting successive zero crossings of said signal on the conductor, and measuring the duration of time between three such successive zero crossings.

7. Apparatus for detecting the presence of dial tone signal on a telephone line comprised of tip and ring leads, said signal being comprised of a first tone signal of first predetermined frequency and a second tone signal of second predetermined frequency, comprising:
   (a) a transformer having a primary winding connected to said tip and ring leads, for receiving and coupling signals carried by said tip and ring leads to a secondary winding, thereof,
   (b) comparator means having a first input connected to said transformer, for receiving said signals coupled thereacross, and
   (c) a microprocessor for:
      (i) generating and applying a first threshold signal to a second input of said comparator means such that an output of said comparator means generates a first control signal in the event a predetermined one of said received signals has an amplitude greater than said first threshold signal,
      (ii) receiving said first control signal, and in response generating and applying a second threshold signal to said second input of the comparator means such that said output generates a succession of second control signals corresponding to zero crossings of said received signal,
      (iii) receiving said second control signals and measuring the duration of time between successive ones thereof, wherein said durations correspond to the periods of a predetermined number of successive cycles of said received signal, and
      (iv) in the event successive ones of said detected periods are different, detecting an average value of said periods, and in the event said average value corresponds to a frequency which is greater than or equal to said first predetermined frequency and less than or equal to said second predetermined frequency, generating a signal indicative of the presence of said dial tone signal.

8. Apparatus as defined in claim 7, wherein said dual tone signal is a dial tone and said conductor is a telephone line comprised of tip and ring leads.

9. Apparatus as defined in claim 8, wherein said secondary winding is connected via a resistor and capacitor series circuit to said first input, for AC coupling said signals coupled by the transformer.

10. Apparatus as defined in claim 9, further including means for superimposing said AC coupled signals on a 2.50 volt DC signal.

11. Apparatus as defined in claim 10, wherein said first threshold signal is approximately 2.49 volts and said second threshold signal is approximately 2.50 volts.

12. A method of detecting the presence on a conductor, of a dual tone signal comprised of a first signal of first predetermined frequency and a second signal of second predetermined frequency greater than said first frequency, comprising the steps of:
  (a) generating a predetermined DC threshold signal having an amplitude of approximately 2.49 volts,
  (b) monitoring said conductor for the presence of an incoming AC signal,
  (c) superimposing said incoming AC signal on a 2.50 volt DC signal,
  (d) comparing said superimposed signal to said threshold signal,
  (e) in the event said superimposed signal is greater than said threshold signal, detecting the periods of a predetermined number of successive cycles of said AC signal, and
  (f) in the event successive ones of said detected periods are the same, providing an indication that said AC signal is a single tone, and in the event successive ones of said detected periods are different, detecting an average value of said periods, and in the event said average value corresponds to a frequency which is greater than or equal to said first predetermined frequency and less than or equal to said second predetermined frequency, generating an output signal indicative of the presence of said dual tone signal.

13. A method as defined in claim 12, wherein the steps of detecting the periods of said successive cycles is further comprised of comparing the amplitude of said superimposed signal to a further threshold signal in the form of a DC signal having an amplitude of approximately 2.50 volts, for detecting successive zero crossings of said signal on the conductor, and measuring the duration of time between three such successive zero crossings.

* * * * *